Nov. 29, 1927.  
J. J. STREMPEL  
1,650,728  
ADJUSTABLE ROLLER BEARING  
Filed Jan. 22, 1927  
2 Sheets-Sheet 1
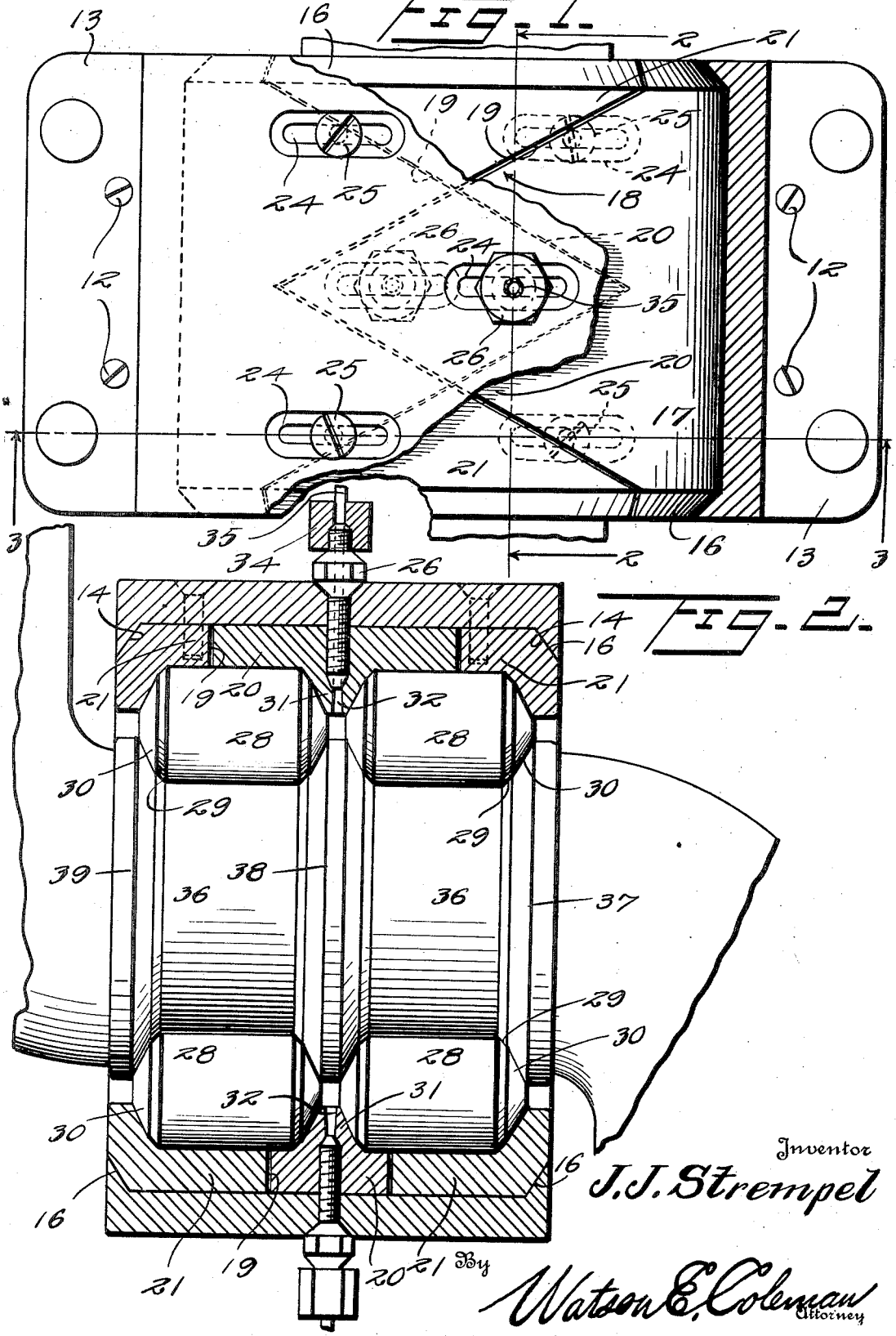
Inventor  
J. J. Strempel  
By Watson E. Coleman  
Attorney

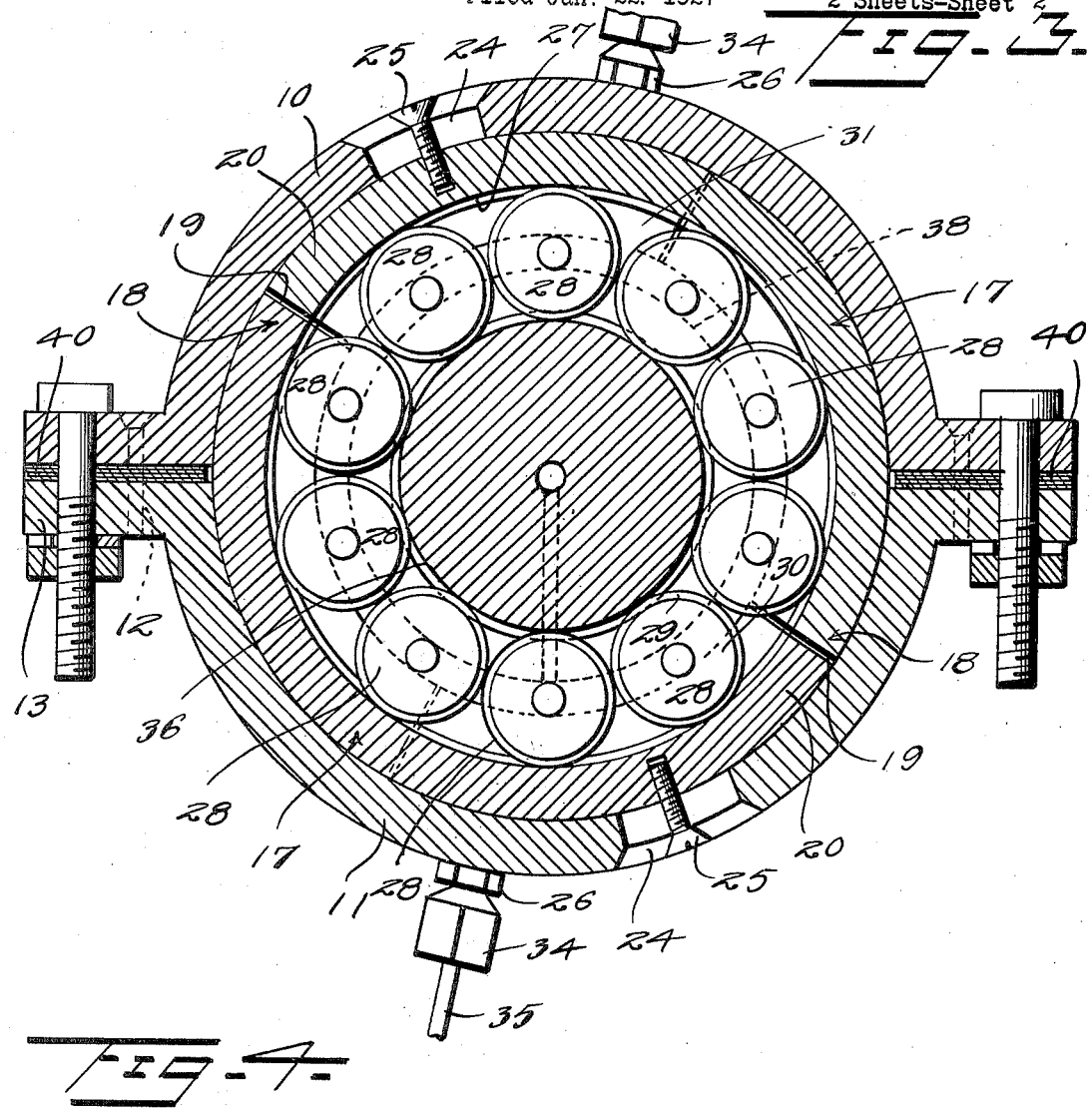
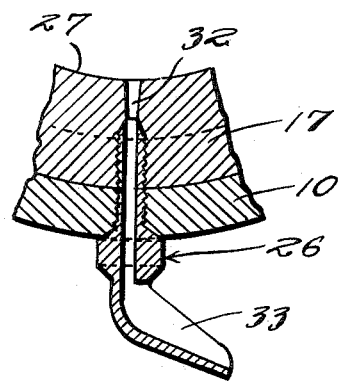

Patented Nov. 29, 1927.

1,650,728

UNITED STATES PATENT OFFICE.

JULIUS J. STREMPEL, OF LEANDER, TEXAS, ASSIGNOR OF ONE-HALF TO EDNA FOSTER, OF LEANDER, TEXAS.

ADJUSTABLE ROLLER BEARING.

Application filed January 22, 1927. Serial No. 162,814.

This invention relates to an adjustable roller bearing.

An important object of the invention is to produce a device of this character permitting slight adjustments to compensate for wear and thus enabling the production of a roller bearing having a life equal to that of the ordinary internal combustion engine.

A further and important object of the invention is to produce a device of this character capable of use upon the main and connecting rod bearings of the crank shaft of an internal combustion engine so constructed that it will stand the stresses and strains to which it will be put in such use and of such character that it may be readily assembled and disassembled.

A further object of the invention is to provide novel and improved means for lubricating the bearing.

These and other objects I attain by the construction shown in the accompanying drawings, wherein for the purpose of illustration is shown a preferred embodiment of my invention and wherein:—

Figure 1 is a plan view of a roller bearing constructed in accordance with my invention, the frame being partially broken away to show the construction of the race elements;

Figure 2 is a vertical sectional view on the line 2—2 of Figure 1;

Figure 3 is a transverse sectional view therethrough on the line 3—3 of Figure 1;

Figure 4 is a detail sectional view showing the construction of a securing element as a scoop.

Referring now more particularly to the drawings, the bearing includes an outer shell formed in two semi-circular sections 10 and 11 adapted to be connected by securing elements 12 and having portions 13 whereby they may be secured to the frame or connecting rod of a motor. At their inner faces, the sections 10 and 11 are provided along their edges with flanges 14, the inner surfaces of which are beveled, as at 15, for coaction with the beveled faces 16 formed upon the exterior surface of semi-cylindrical race sections 17, so that these race sections will be maintained at all times centrally disposed with relation to the frame sections 10 and 11.

Opposite ends of the race sections 17 interdigitate, as generally indicated at 18, each of the sections being formed at one end with a notch 19 and at its opposite end with a tapered tongue 20 adapted to extend into the notch of the other of the sections. In the wings 21 formed by the notch 19, each race section 17 is provided with a threaded bore 22 and a similar bore 23 is formed in the tongue 20. Each frame section 10 and 11 is formed near its center with a group of circumferentially elongated slots 24 for the passage of securing elements 25 and 26 for engagement in the openings 22 and 23 to secure the race sections in adjusted positions within the frame. As will hereinafter more clearly appear, the securing element 26 is of special construction and assists in lubrication of the completed bearing.

The inner faces of the race members are formed with grooves 27 for the reception of rollers 28, the ends of which are provided adjacent the circumference of the roller with a short quick taper and from the ends of this short quick taper to their centers with a relatively long taper 30 after the manner of constructing a well known bearing roller now on the market. It will be obvious that the rollers in their passage from one to the other of the race sections will have a relatively wide bearing surface upon the race, even during their passage over the slots between adjacent faces of the tongue 20 and notches 19 at the ends of the race sections. It will also be obvious that between the grooves 27, a ridge 31 will be formed. With this ridge the bore 23 aligns and from the lower end of this bore, a port 32 is formed which leads to the lower end of the ridge and accordingly to the space between adjacent ends of the roller 28. The securing element 26 is hollow and may have its outer end either constructed as a scoop, as indicated at 33 in Figure 4 or as a union 34 whereby it may be connected to an oil line 35. The shaft with which the bearing is employed is preferably provided with grooves 36 corresponding to the grooves 27 of the bearing sections. In the present instance, the shaft is disclosed as having ridges 37, 38 and 39 formed thereon by means of which the grooves are formed. Where the shaft is provided with a lubricant channel, the outlet for this channel may be left through the ridge 38, as indicated, as this ridge corresponds to the ridge 31 of the race element.

In applying the device to a shaft, initially, shims 40 are introduced between adjacent ends of the frame sections, so that this frame section may be contracted after a given running period. In applying the bearings, each race section may receive as many rollers as it can hold and be applied to the shaft from the under surface thereof. After application, the applied section can be moved to the upper surface of the shaft to permit application of the other section. With the two race sections and rollers in position, the application of either half of the frame section over the joint between the sections will lock them in position upon the shaft. The securing elements 25 and 26 are left loose until the frame has been secured in adjusted position, after which they may be tightened, care being taken that adjacent ends of the race sections are uniformly spaced.

Since the construction hereinbefore set forth is capable of a certain range of change and modification without materially departing from the spirit of the invention, I do not limit myself to such specific structure except as hereinafter claimed.

I claim:—

1. In a roller bearing, a sectional race the end portions of which interdigitate, a circular frame surrounding the race and adjustable as to diameter, means extended through the frame and engaging the race sections for securing them in adjusted positions with relation to one another and roller receiving grooves formed in the inner face of the race, adjacent edges of the grooves being spaced whereby a ridge is formed therebetween, one of said securing elements aligning with the ridge between adjacent edges of the grooves, a port extending from the inner end of the ridge to the bore of the race receiving the securing element, said securing element having an axial bore and being provided at its outer ends with means for feeding lubricant to the bore.

2. In a roller bearing, an inner member and an outer race formed upon opposed faces with circumferentially extending roller grooves, a series of rollers in each groove, means for admitting lubricant to the bearing between the grooves including an outer frame within which said race is mounted and securing elements extending through the outer frame and engaging the race and engaging in threaded openings formed in the race, one of said threaded openings aligning with the rib between adjacent roller grooves, a port connecting said opening with the groove, the securing element engaged in the opening having a bore for the passage of lubricant.

3. In a roller bearing, an inner member and an outer face formed upon opposed faces with circumferentially extending roller grooves, a series of rollers in each groove, means for admitting lubricant to the bearing between the grooves including an outer frame within which said race is mounted and securing elements extending through the outer frame and engaging the race and engaging in threaded openings formed in the race, one of said threaded openings aligning with the rib between adjacent roller grooves, a port connecting said opening with the groove, the securing element engaged in the opening having a bore for the passage of lubricant and being formed at its outer end as a scoop.

In testimony whereof I hereunto affix my signature.

JULIUS J. STREMPEL.